Figure 1:
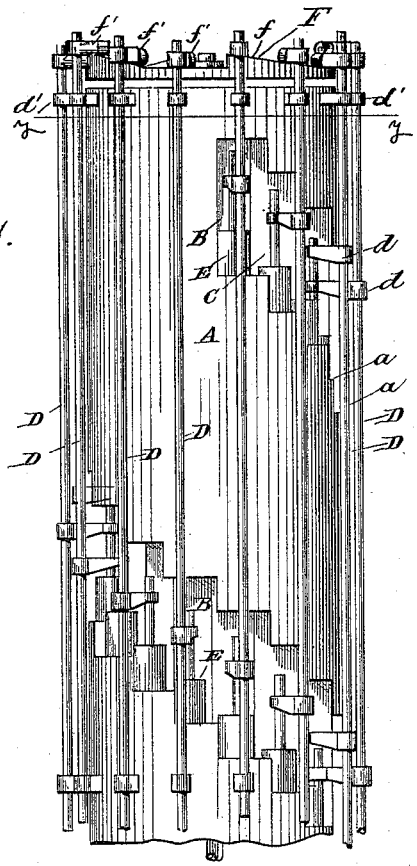

(No Model.) 2 Sheets—Sheet 1.

A. STEVENS.
PULVERIZING APPARATUS.

No. 537,554. Patented Apr. 16, 1895.

Witnesses
Wm. H. H. Knight.
H. F. Bernhard

Inventor
Austin Stevens
By Attorneys, Edson Bro's (No Model.) 2 Sheets—Sheet 2.
A. STEVENS.
PULVERIZING APPARATUS.
No. 537,554. Patented Apr. 16, 1895.
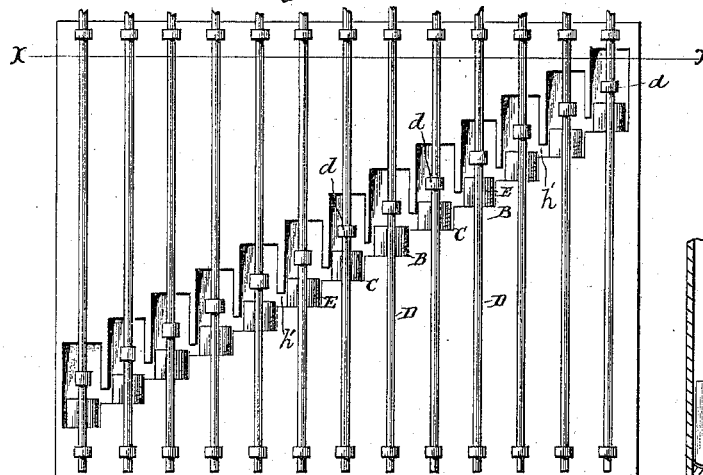
Fig. 5.
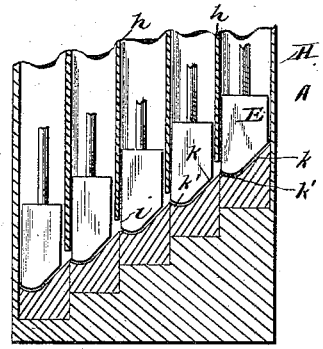
Fig. 8.
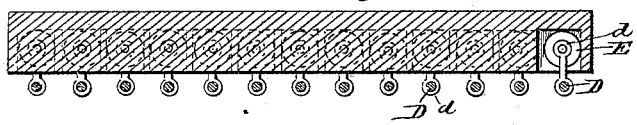
Fig. 6.
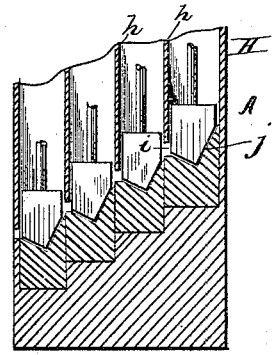
Fig. 9.
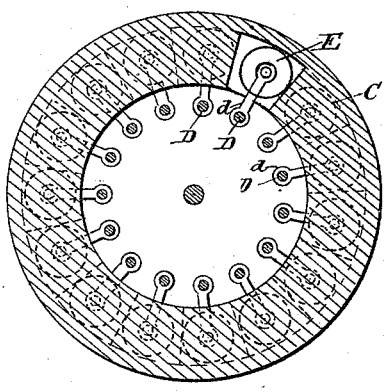
Fig. 7.
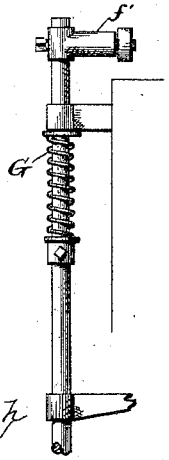
Fig. 10.
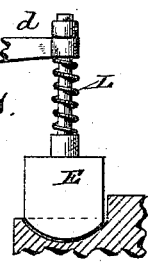
Fig. 11.
Fig. 12.
Witnesses
Wm H. H. Knight
H. F. Burkhart
Inventor
Austin Stevens
By Attorneys, Eadoon Bro's

United States Patent Office.

AUSTIN STEVENS, OF BROOKLYN, NEW YORK.

PULVERIZING APPARATUS.

SPECIFICATION forming part of Letters Patent No. 537,554, dated April 16, 1895.

Application filed November 24, 1893. Renewed September 18, 1894. Serial No. 523,421. (No model.)

*To all whom it may concern:*

Be it known that I, AUSTIN STEVENS, a citizen of the United States, residing at Brooklyn, in the county of Kings and State of New York, have invented certain new and useful Improvements in Pulverizing Apparatus; and I do hereby declare the following to be a full, clear, and exact description of the invention, such as will enable others skilled in the art to which it appertains to make and use the same.

This invention relates to improvements in apparatus for pulverizing either wet or dry material, and more particularly to devices of that class in which the material is subjected to a pounding action between a reciprocating hammer or stamp and a stationary bed; and the objects in view are, first, to so construct and arrange the parts that the material is gradually reduced by being subjected to the pounding action of a number of stamps in as many different compartments or mortars, in order to pulverize the material to the desired fineness; secondly, to combine the hammers or stamps in a manner to economize the power and increase the rapidity and efficiency of action; thirdly, to so arrange the mortars that the material being reduced therein can pass or feed by gravity from one mortar to the other; and to simplify the construction and thereby produce a plant or apparatus which can be erected at a low cost.

With these ends in view, the invention, broadly stated, consists of an upright column, shaft or wall which is provided on its vertical surface with a series of mortars one below the other in step-like order or arrangement and with the upper mortar connected to the next lower one of the series to discharge the material thereto and thus have the mortars discharge successively one to the other, combined with stamps corresponding in number to the mortars and one stamp being arranged to act in each of the mortars, and suitable mechanism for reciprocating the stamps.

To effect economy in the construction and operation of the apparatus or plant, and also to compactly dispose the parts, I employ a number of driving rods, each of which carries a single stamp adapted to one of the mortars of the series, or each rod may carry a series of stamps disposed on the rod one above the other and adapted to the respective mortars of the series, and these driving rods are arranged, guided or sustained outside of the mortars, so that the rods do not pass through said mortars. With these driving rods are combined mechanical contrivances whereby the rods and stamps are positively reciprocated and the hammers or stamps brought to operate with force upon the material in the mortars. As one mechanism for operating the driving rods, I provide a cam wheel at one end of the apparatus, with which engage tappets on the rods to lift the latter vertically, and the rods and their connected stamps are impelled downward by gravity, springs, weights, or equivalent means, so that the stamps act upon the material in the mortars with sufficient force to crush and pulverize the same.

The mortars arranged in step-like order communicate with one another through openings or passages in a divided casing, whereby the material being acted upon is permitted to pass by gravity from one mortar to the next adjacent mortar just below it; and to provide for the more expeditious or rapid feeding of the material from one mortar to the other, the beds of the mortars are preferably inclined from the opening or passage in the casing to a point near the opposite side of the mortar-bed, at which lower side of the mortar-bed a short flange or shoulder rises toward a partition in the casing, thus permitting the material to be brought beneath the stamp and to pass easily over the shoulder and into the next lower mortar.

The upright column or shaft may be constructed with recesses in its vertical face to accommodate or form the mortars, and this shaft or column may be either solid or hollow. I contemplate making the shaft or column in the form of a circular, polygonal, or square solid shaft, or in the form of a perpendicular wall with plane sides; or the shaft or column may be made hollow. In this hollow shaft, on the inside thereof, I provide the mortars, or the mortars may be on the outside vertical face of the hollow shaft, or said mortars may be provided on both the inside and the outside vertical faces of the shaft. These mortars on the shaft may be disposed in a spiral or zig-zag order on the vertical face of the shaft, or they may be disposed in two, three or more series. When two or more series of mortars are employed on the same vertical face of the shaft or column, I preferably dispose them so that the mortars of adjacent series are in the same vertical line, and provide each driving rod with a corresponding number of stamps adapted to such vertically aligned mortars, whereby each rod is adapted to have its stamps operate in two or more of the mortars.

To enable others to understand my invention, I will now proceed to a detailed description of the different embodiments thereof, reference being had to the accompanying drawings, forming a part of this specification, and in which—

Figure 3:
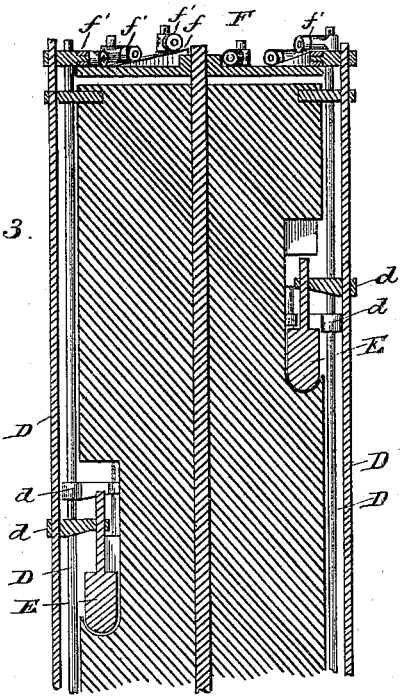
Figure 2:
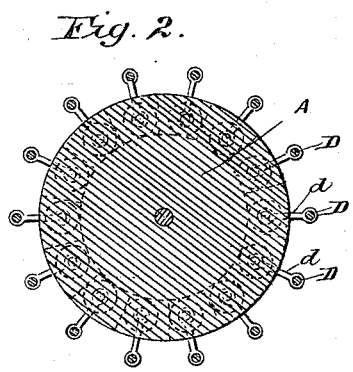
Figure 4:
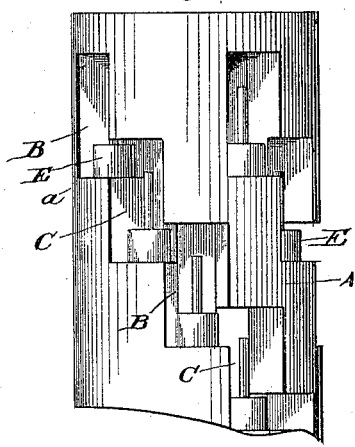

Figure 1 is a side elevation of a shaft having one spiral or helical series of mortars on its outside vertical surface. Fig. 2 is a horizontal transverse section on the plane indicated by the dotted line y—y of Fig. 1. Fig. 3 is a vertical longitudinal sectional elevation of a part of the construction shown by Fig. 1. Fig. 4 is a detail elevation, with the driving rods and their actuating mechanism omitted, showing a part of a shaft or column in elevation and with two series of mortars arranged in spiral or zig-zag order around the outside vertical face of the shaft. Fig. 5 is a front elevation of a plane wall with a zig-zag series of mortars on one of its vertical faces, and Fig. 6 is a horizontal sectional view through the construction shown by Fig. 5, on the line $x\ x$. Fig. 7 is a horizontal sectional view through a hollow shaft or column with mortars on the inside vertical face thereof. Fig. 8 is a detail vertical sectional view illustrating a partitioned casing inclosing a series of mortars and showing the mortar-beds constructed to facilitate feeding the material from one mortar-compartment or chamber to the next chamber just below it. Fig. 9 is a vertical sectional view, similar to Fig. 8, but showing the mortar-beds differently constructed. Fig. 10 is a detail view of one of the vertical driving rods. Fig. 11 is a detail view of one of the stamps, showing it provided with a convex working face and the mortar-bed with a concave surface adapted to the form of the stamp. Fig. 12 is a detail view of two of the mortars, showing an inclined deflector or baffle-plate for preventing the material from flying up above the stamp.

Like letters of reference denote corresponding parts in all the figures of the drawings, referring to which—

A designates the upright column or shaft.

B, C, are the series of mortars.

D, are the vertically-reciprocating driving-rods, and E are the stamps which are carried by the driving-rods so as to reciprocate therewith and said stamps being adapted to operate in the mortars.

The upright column or shaft, A, may be constructed of masonry, metal, or other suitable material in any preferred way, and the shaft may be either circular, square, polygonal, or other desired form in cross section, or it may be embodied in the form of a perpendicular wall, with parallel plane surfaces.

In the embodiment of the invention shown by Figs. 1, 2 and 3 of the drawings, I provide a solid shaft or column, A, which is circular in cross section, and on the outside vertical surface of this solid shaft I construct the recesses and the ledges, $a$, which practically form the mortars, B, C. These mortars are arranged one below the other in step-like order, forming a single spiral, and as shown by Fig. 1, they extend around the shaft in continuous series, from the bottom to the top thereof; and these ledges or offsets, $a$, afford a substantial support for the mortars, in case it is found desirable to make the mortars separate from the ledges or beds $a$ and to place separate mortars within the recesses and upon the ledges or beds, sufficient to enable them to successfully stand the strain or wear to which they are subjected under the impact of the reciprocating stamps. The mortar, B, is arranged above and to one side of the mortar, C, and the latter mortar is similarly disposed relatively to the next adjacent mortar of the series, thus securing the zig-zag or step-like order and arrangement.

The driving rods, D, are placed to one side of the vertically aligned mortars, and the shaft, so that the rods do not pass through the mortars, and on each driving rod is fixed an arm, $d$, which extends laterally from the rod, over the mortar. To these arms, $d$, are fixed the shanks of the stamps E, so that the stamp is movable with its rod, and each stamp is arranged within the mortar to operate therein. The driving rods are arranged at proper intervals around the shaft or column, A, to suit the mortars, and these rods are fitted in guides or supports, $d'$, in which they have a rectilinear reciprocating motion. I prefer to elevate the rods of the series alternately by mechanical appliances, and as the simplest form of this lifting mechanism, I provide a horizontal cam wheel, A, at one end of the column or shaft, A, and said cam wheel is carried by a suitable shaft to which power is applied in any preferred way. This cam-wheel, F, has a series of cams, $f$, spaced at suitable intervals to properly actuate the series of driving rods, and the rods are provided with tappets or trailers, $f'$, which ride upon the cams so that as the wheel F rotates, the cams will lift each rod and the stamps thereon. The weight of the rod and its stamp may be sufficient to secure the impact necessary for the stamps to pulverize the material in the mortars, but I prefer to accelerate the descent of the rod and its stamps and thereby increase the crushing effect of the stamps on the material, by means of springs or weights. I have shown the spring G as applied to the rod and acting against collars, in Fig. 10 of the drawings, but it is evident that a weight can be used in lieu of the spring, and that other equivalent mechanical contrivances can be used in lieu of the weight or spring to impel the rods and stamps with force upon the material in the mortars.

The mortars, B, C, are inclosed within a casing, H, which fits closely to the shaft or column and over the beds of the mortars, see Figs. 8 and 9, to prevent the pulverized material from flying up and escaping, and in this casing is provided a number of vertical partitions, $h$, which serve to divide the casing into a series of compartments, I, one compartment being devoted to each mortar. In these partitions, $h$, are provided openings, $i$, which are situated at the lower end of the partition, or just above the bed of the mortar, and through these openings, $i$, the material can pass, when acted on by the stamps, from the upper mortar to the next lowest mortar, and from thence to the next, and so on throughout the series of mortars, until the material reaches the end mortar, by which time it is in a finely powdered condition, having been acted on or powdered by the large number of stamps contained in the apparatus.

My invention also contemplates the use of a hollow upright shaft or column, and in Fig. 7 of the drawings, I have shown such a column or shaft with the mortars, B, C, on the inside vertical face thereof, said mortars being disposed in one or more spiral series around the inside face of the shaft and the driving rods being arranged at one side of the series of mortars. It is evident that the hollow column or shaft can be provided with mortars on both its inside and outside vertical surfaces, and that the series of driving rods for the stamps can be operated from a common cam-wheel or that said series of driving rods may be independently actuated from separate driving mechanisms.

The single helical series of mortars on the shaft or column shown by Figs. 1 and 2 is carried or extended around the shaft one or more times in order to bring certain of the mortars in the same vertical line with each other, and the driving rod is now provided with a series of stamps which correspond in number to the vertically-aligned mortars, thus adapting each rod to actuate a number of stamps for two or more mortars.

In Fig. 4 I have shown the column with two series of spirally disposed mortars in which the mortars of one series are in vertical alignment with the mortars of another series, and in this embodiment the stamps of the vertically-aligned mortars are carried and actuated from a single driving rod, as is obvious.

My improvements may also be embodied in an upright shaft or column in the form of a a perpendicular wall with plane sides which are parallel to each other, as shown by Figs. 5 and 6, and in one or both vertical faces of this wall the series of zig-zag mortars, B, C, are provided, in which mortars operate the stamps, E, that are carried by the vertical driving rods, D. This wall or the column may be constructed with partitions, $h'$, equivalent to the partitions, $h$, of the casing, H, which partitions, $h'$, depend from the upper sides of the recesses well down into the latter toward the mortar-beds, and the front sides of the mortars may be closed by the casing or in any suitable way to prevent the material from escaping.

The working face of the mortar-bed may be of any desired form, as I may give to the bed and stamp a conical shape, or a concave shape, or other desired configuration.

In Figs. 3 and 11, the mortar bed has a concavity and the stamp a corresponding convex face.

In Fig. 9, the mortar-bed has a conical or V-shaped surface and the stamp is given a corresponding conical or V-shaped lower working face; but in either case, the opening, $i$, is just above the adjacent lower mortar-bed and practically in line with the level of the upper adjacent bed.

The inclined side of the mortar-bed may be extended, as at $j'$, in Fig. 12, to the opening, $i$, in order to conduct the material from the upper mortar to the lower mortar, in proper position beneath the stamp in the lower mortar, to be pulverized thereby.

The mortar-bed may be given the inclined working surface $k$ shown by Fig. 8 of the drawings, in order to facilitate feeding the material.

Each mortar-bed has the long inclined side, $k$, and the short ledge or flange, $k'$, and this long side of one mortar bed extends up to the short flange, $k'$, of the adjacent upper mortar, whereby the material is precipitated down the inclined side, $k$, arrested in the bottom or lowest point of the bed by the flange $k'$ to be acted on by the stamp and then passes over the flange, $k'$, into the next lower compartment or mortar.

The stamp may have its stem mounted in a sleeve or bearing on the arm, $d$, of the driving rod, and the stamp is impelled downward by a coiled spring, L, which acts between the head of the stamp and the sleeve or arm in which the stamp-stem is slidable, the stem being held from displacement by a head or collar on the upper end of said stem, as shown by Fig. 11.

The partition, $h$, may have an inclined baffle-plate or deflector, J, arranged parallel to the inclined wall, $j'$, of the mortar-bed as shown by Fig. 12 of the drawings so as to cause the material to pass beneath the stamp.

The bed of the mortar may be made of stone, masonry, concrete, or other durable material, or it may be faced with metal, as desired.

The operation may be briefly described as follows:—A suitable hopper is provided at the top of the column or shaft, and the material to be pulverized, either in a wet or dry condition, is supplied to this hopper and from thence to the upper mortar, B. The cam-wheel being set in motion, the tappets are lifted by the cams on said wheel and the tappets in turn lift the rods and stamps successively. The material passes from the mortar, B, into the mortar, C, through the opening, and from the latter mortar into the next lowest mortar, and so on through the whole series of mortars; and these stamps act upon the material on the mortar-beds to crush and pulverize the same gradually, so that by the time the material reaches the lowest mortar it is in the desired powdered condition.

I am aware that changes in the form and proportion of parts and in the details of construction of the mechanisms herein shown and described as an embodiment of my invention can be made without departing from the spirit or sacrificing the advantages of my invention and I therefore reserve the right to make such modifications and alterations as fairly fall within the scope of my invention.

Having thus fully described my invention, what I claim as new, and desire to secure by Letters Patent, is—

1. The combination of the upright column or wall provided on its vertical surface with a series of recesses in step-like order, a series of stamps within said recesses, and vertical rods exterior to the surface of the column and connected with one or more of said stamps, substantially as and for the purposes described.

2. The combination of an upright or column having in its vertical surface a series of recesses or mortars in step like order, a series of stamps within said recesses, and a vertical reciprocating rod outside of the vertical surface of said upright or column and connected to a plurality of such stamps, substantially as and for the purposes described.

3. The combination of a cylindrical column having in its cylindrical surface a spiral series of recesses and mortars, a series of stamps within said recesses and mortars, and vertical reciprocating rods outside of said cylindrical surface and connected to a plurality of said stamps, substantially as and for the purposes described.

4. In a pulverizing apparatus, the combination of an upright column or shaft provided on its vertical surface with two series of mortars arranged in step-like order and with the individual mortars of one series in vertical alignment with the mortars of the other series, a series of stamps operating in said mortars, and vertical rods outside of the vertical surface of the column or shaft and connected to a plurality of the stamps, substantially as and for the purposes described.

5. In a pulverizing apparatus, the combination of an upright column or shaft provided on its vertical surface with a series of mortars arranged in step-like order, one below the other, and with certain mortars of the series arranged in the same vertical line with mortars above or below the same, a series of stamps operating in said mortars, and a series of reciprocating rods situated outside of the vertical surface of the upright or column and connected to a plurality of such stamps, substantially as and for the purposes described.

6. A pulverizing apparatus comprising an upright column or shaft constructed with mortars situated one below the other in step-like order, a casing which incloses the mortars and provided with partitions which isolate one mortar from those adjacent thereto, a series of reciprocating rods outside of the mortars and casing, and a series of stamps carried by the rods and adapted to operate in the mortars, substantially as and for the purposes described.

7. A pulverizing apparatus comprising an upright column or shaft having in its vertical surface a series of mortars which are situated one below the other in step-like order, a casing constructed to inclose the mortars, the partitions within the casing to divide the mortars one from the other, and each partition provided with an opening, $i$, near the bottom thereof, a series of reciprocating rods, and the stamps carried by said rods, substantially as and for the purposes described.

8. A pulverizing apparatus comprising the upright or column constructed with mortars arranged one below the other in step-like order and each mortar having the inclined wall, $j'$, adjacent to the next mortar above it, a casing inclosing the mortars, the partitions within the casing, between the mortars, and each having an opening, $i$, and the baffle-plate over said inclined wall, $j'$, of the mortar, and a series of stamps, substantially as and for the purposes described.

9. A pulverizing apparatus comprising the upright column or shaft constructed with connected mortars arranged in series in step-like order and each mortar being in substantial vertical alignment with those above or below it, a series of reciprocating rods each carrying two or more stamps adapted to the vertically aligned mortars, and mechanism for increasing the impact of the stamps upon the material in the mortars, substantially as and for the purposes described.

10. A pulverizing apparatus comprising an upright column or wall provided on its vertical face with a series of communicating mortars arranged in step-like order one below the other, the stamps operating in said mortars, and driving rods having the stamps connected thereto, substantially as and for the purposes described.

11. A pulverizing apparatus comprising an upright column or wall provided in one of its vertical faces with a series of communicating mortars arranged one below the other in step-like order, the stamps operating within said mortars, and the driving rods arranged exteriorly to the mortars and having the stamps connected thereto, substantially as and for the purpose described.

12. A pulverizing apparatus comprising an upright hollow column having connected mortars on its vertical face which are arranged one below the other in step-like order, the vertical driving rod arranged exteriorly to the mortars and the stamps carried by the driving rods and operating within the mortars, substantially as and for the purposes described.

13. A pulverizing apparatus comprising an upright column or wall provided in its vertical face with a series of connected mortars arranged in step-like order and each mortar having its working face inclined upward toward the lower side of the next upper mortar bed, and a series of reciprocating stamps operating within said mortars, substantially as and for the purposes described.

In testimony whereof I affix my signature in presence of two witnesses.

AUSTIN STEVENS.

Witnesses:
E. F. MEAD,
DWIGHT STUDWELL.